E. & J. L. Hall,
Fire-Proof Safe.
N° 152. Reissued Dec. 18, 1849.
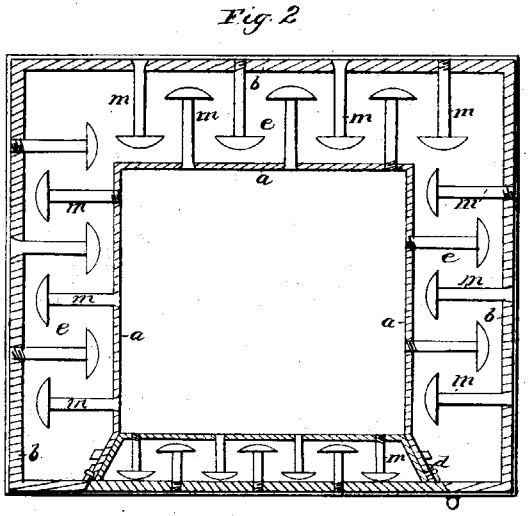
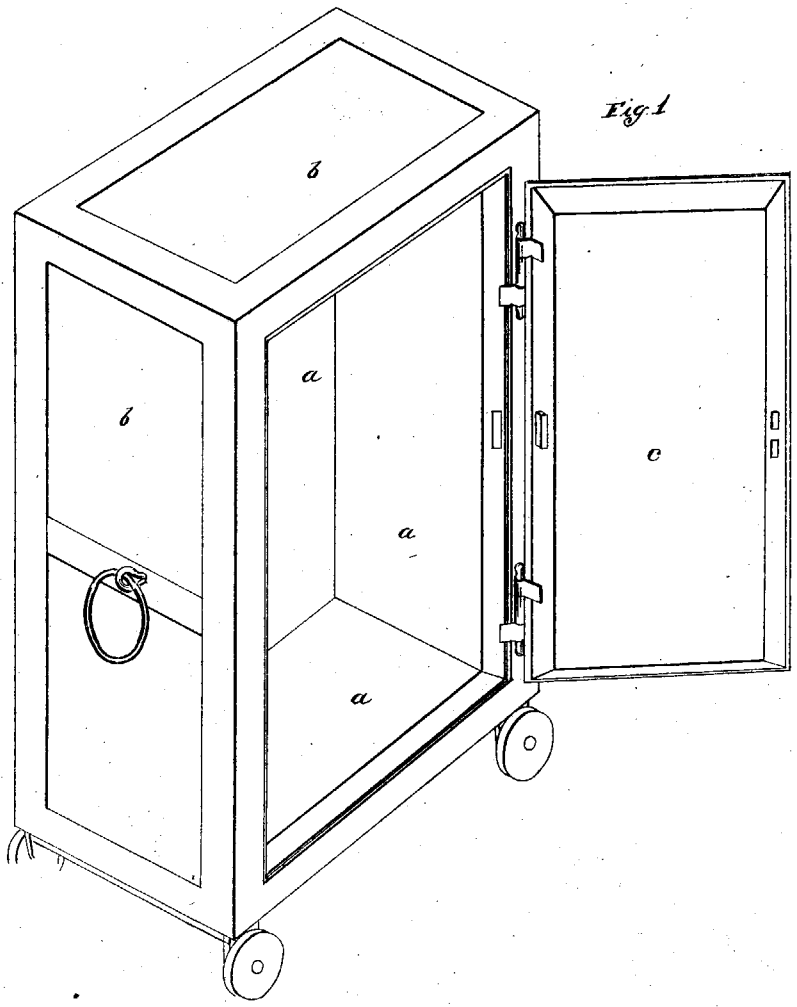
AM. PHOTO-LITHO. CO. N.Y. (OSBORNE'S PROCESS.)

UNITED STATES PATENT OFFICE.

EDWARD HALL AND JOSEPH L. HALL, OF CINCINNATI, OHIO.

IMPROVEMENT IN FIRE-PROOF SAFES.

Specification forming part of Letters Patent No. 6,655, dated August 21, 1849; Reissue No. 152, dated December 18, 1849.

*To all whom it may concern:*

Be it known that we, EDWARD HALL and JOSEPH L. HALL, of Cincinnati, in the county of Hamilton and State of Ohio, have invented certain new and useful Improvements in Fire-Proof Safes, of which the following is a full, clear, and exact description, reference being had to the annexed drawings of the same, making part of this specification, in which—

Figure 1 is a perspective view of the safe, its door being open; and Fig. 2 is a horizontal section, the door being shut.

The same letters indicate the same parts in all the figures.

Experience has demonstrated that a safe designed as a depository of books and papers, money, and other valuables should be rendered as strictly proof against fire, burglars, and damp as possible; and by our improvement we seek to attain the greatest security on these three several heads. These several requisites are attained in our improved safe by constructing the interior case or lining of the safe of iron or some other metallic substance instead of wood, as has been previously done in safes of this description, and in attaching the lining so constructed to the door-frame by rivets or otherwise in a strong and substantial manner, anchors being attached to the interior of the exterior case and to the exterior of the interior case, and projecting into the space between the two, this space being filled with hydraulic cement, thus firmly uniting the whole by a solid insulating medium which possesses the several requisites of hardness and resistance to fire and damp in a higher degree than any substance previously used for the purpose.

In the drawings, *b* is the exterior case, formed of sheet-iron and united at the corners by angle-iron, to which the sides are firmly riveted or screwed. Within this case an interior casing of iron, *a*, is inserted. This is formed with flanges around its front edge, thus forming the door-frame, which is riveted to the outer case, thus connecting the interior with the exterior; or, if preferred, a door-frame may be made separate and securely attached by rivets to the interior and exterior cases. Anchors *m* are attaceed to both the interior and exterior cases. These project into the space between the two cases, so that when the cement which serves as the insulating medium is poured into this space it firmly attaches the whole body of the case together, and by the great hardness which it speedily attains renders this safe more secure than any in which any of the previously-used insulating mediums are employed. The advantages resulting from this construction are, first, that the walls of the safe, instead of having a considerable portion of their mass of wood, as is the case with all safes made in the usual manner, are composed exclusively of metal and cement, thus increasing their resistance to heat, and rendering them far less liable to become damp and thus injure the articles inclosed in them; second, in our safes the door-frame and the door, which is bolted fast to it in locking, are secured to an interior metallic case, which is firmly united to the exterior case by anchors embedded in a solid cement, thus effectually preventing the removal of the door and its frame by driving in with a punch or cutting off with a cold-chisel the heads of the rivets found on the face or sides of the safe above, below, and on each side of the door; whereas in safes of the usual construction the interior wooden case does not oppose any obstacle to the removal of the door with its frame in the manner above mentioned, as the latter is not attached to it, but merely rests against it.

The method of connecting the exterior and interior cases by anchors embedded in cement possesses a great advantage over the method usually adopted of connecting the two by through rivets or bolts, which, being excellent conductors, transmit the heat from the exterior case to the interior, whereas by the use of anchors the insulating cement in which they are embedded prevents the transmission of the heat from those of the exterior to those of the interior case.

Having thus described our improved concrete safe, what we claim therein as new, and desire to secure by Letters Patent, is—

1. Joining the interior and exterior cases by the door-frame, and connecting both cases with the insulating cement by means of the anchors embedded therein, substantially as herein set forth.

2. The employment in chests so joined of hydraulic cement as the insulating substance for fire-proof safes or chests, it being stronger when concreted than other cements heretofore used for the purpose, thus making a safe of superior strength and durability, especially when the same is constructed in the manner herein described.

EDWARD HALL.
JOSEPH L. HALL.

Witnesses as to the signature of E. Hall:
P. H. WATSON,
E. S. RENWICK.

Witnesses as to the signature of J. L. Hall:
W. F. BRISCOE,
B. SMITH.